United States Patent [19]

Taylor et al.

[11] 4,156,543

[45] May 29, 1979

[54] TRACTOR TRAILER AIR DEFLECTOR DEVICE

[75] Inventors: John Taylor, St. Albans; John K. Kennedy, Newport Pagnell, both of England

[73] Assignee: General Motors Corporation, Detroit, Mich.

[21] Appl. No.: 800,608

[22] Filed: May 26, 1977

[30] Foreign Application Priority Data

Jun. 24, 1976 [GB] United Kingdom ............... 26350/76

[51] Int. Cl.² .............................................. B60J 9/00
[52] U.S. Cl. ................................... 296/1 S; 105/2 R; 296/91
[58] Field of Search ......................... 296/1 S; 160/290; 105/2 R; 280/403

[56] References Cited

U.S. PATENT DOCUMENTS

| | | |
|---|---|---|
| 3,834,752 | 9/1974 | Cook et al. ............................ 296/1 S |
| 3,947,065 | 3/1976 | Geiger .................................. 296/1 S |
| 3,951,445 | 4/1976 | Tatom ................................... 296/1 S |
| 3,972,556 | 8/1976 | Mason, Jr. ............................ 296/1 S |
| 4,035,013 | 7/1977 | Abbott .................................. 296/1 S |
| 4,082,340 | 4/1978 | Taylor .................................. 296/1 S |

Primary Examiner—Richard A. Bertsch
Attorney, Agent, or Firm—Charles E. Leahy

[57] ABSTRACT

An adjustable air-deflector device adapted to be movably mounted on the roof of a driving cab of a commercial vehicle and comprising a substantially planar member having the shape of a truncated isosceles triangle, the shorter parallel edge of which is hinged to the cab roof, and the non-parallel edges of which are connected to the cab roof through adjustable bellows-type side walls, there being angle-adjustment means provided to allow the driver of the vehicle to adjust the angle of the planar member relative to the cab roof to produce minimal drag over a trailer portion of the vehicle. Driver determines optimum angle either from a table of predetermined figures or from a drag pressure metering instrument mounted in the cab of the vehicle. Air-deflector device can be used in a tractor-trailer assembly in combination with adjustable side curtains, which close the gap between the tractor and trailer and reduce the component of drag produced by yaw between the moving tractor and trailer.

1 Claim, 4 Drawing Figures

TRACTOR TRAILER AIR DEFLECTOR DEVICE

This invention relates to an air-deflector device for mounting on the roof of a driving cab of a commercial vehicle in order to improve the aerodynamic characteristics of said commercial motor vehicle. In particular, it relates to an air-deflector device for use on a driving cab of a tractor-trailer vehicle, in which the trailer comprises the load-carrying portion of said vehicle and exhibits a frontal profile which is substantially larger than that of the driving cab.

Air-deflector devices for improving the aerodynamic characteristics of commercial motor vehicles are already known, these devices comprising structures mounted upon the roof of the vehicle cab and designed to deflect the air stream passing the moving vehicle over the load-carrying portion of the vehicle in as smooth a manner as possible. Unfortunately, one defect suffered by many of these devices is that the device only reduces the drag experienced on the vehicle to a minimum if the load-carrying portion of the vehicle is matched in size, configuration and position relative to the air deflector device. In other words an air-deflector device mounted on the roof of the cab of a commercial vehicle could be expected to reduce the aerodynamic drag on that vehicle, when in motion, below the aerodynamic drag on a similar moving vehicle without such an air deflector device, but, unless the size and shape of the air deflector device conforms to an optimum size and shape for a given size, configuration and position of the load-carrying portion to said device, the aerodynamic drag on said vehicle will not be reduced to the minimum possible.

An adjustable air-deflector device according to the invention, adapted to be movably mounted on the roof of a driving cab of a commercial motor vehicle so that, when said vehicle is moving in a forward direction, air is deflected by said device over the roof of a load-carrying portion of said vehicle, comprises: a substantially planar member having the shape of a truncated isosceles triangle, the shorter of the parallel edges of which is pivotally mountable upon said driving cab roof adjacent a forward edge thereof; angle-adjustment means attached to said planar member and engageable with said driving cab roof to adjust the angle of inclination of said planar member relative to said roof between a predetermined minimum angle and a predetermined maximum angle; and adjustable side walls, each of which extends along the length of a non-parallel edge of said planar member and has a free edge securable to said driving cab roof in such a manner as to bridge the triangular-shaped gap formed between said non-parallel edge and said driving cab roof at any angle of inclination of said planar member between said predetermined minimum and maximum angles.

The predetermined minimum angle of inclination of said planar member is such that the air-deflector device, when mounted upon the roof of said driving cab, can be adjusted into a position in which said planar member lies substantially parallel to the plane of the roof of said driving cab. The predetermined maximum angle is such that the air-deflector device, when mounted upon the roof of said driving cab, can be adjusted to give a minimum drag characteristic for the vehicle when the load-carrying portion thereof is at a maximum height relative to the cab roof.

Preferably, each side wall comprises flexible sheet material folded in accordion pleats.

In many modern commercial motor vehicles, the width of the driving cab is substantially equal to that on the load-carrying portion of the vehicle. In these circumstances, the length of the longer of the two parallel edges of said planar member is made equal to the width of said driving cab roof.

The angle-adjustment means preferably extends between the longer of the parallel edges of the planar member and said driving cab roof. This angle-adjustment means may be mechanically operated, electrically operated, or pneumatically operated, and may operate to vary said angle of inclination either continuously or by discreet angular increments. Preferably the angle-adjustment means is calibrated to indicate said angle of inclination when said device is mounted on said driving cab roof. An advantageous arrangement for the calibration of the angle-adjustment means would be the use of a system which is visible to an operator seated in said driving cab, the angle-adjustment means being adjustable by said operator from his seated position. A further improvement of this concept is one in which the system of calibration would enable the operator to adjust the angle-adjustment means to obtain the optimum angle of inclination of the device for minimum drag on the vehicle whilst the vehicle is in motion.

It is envisaged that the air-deflector device of the invention should be relatively portable when unmounted on a driving cab roof. In this respect, in one embodiment of the invention, the substantially planar member is sub-divided by a hinge portion which allows the device, when unmounted on a driving cab roof, to be folded into a shape which is readily packaged and transported.

In a preferred embodiment of the invention for a tractor-trailer vehicle, an adjustable air-deflector device according to the invention is used in combination with a pair of side curtain air deflectors, each of which is adapted to be mounted on one side of said tractor-trailer vehicle so as to bridge the gap existing between the driving cab of the tractor and the load-carrying trailer, and comprises a substantially rectangular sheet of flexible material, one end of which is secured to a spring-biased roller movably mounted within a support frame so that said sheet is retained in a rolled formation upon said roller in the manner of a roller blind, the other end of said sheet and said support frame being respectively securable to a forward vertical side edge of said load-carrying trailer and to a rear side edge of said driving cab, or vice-versa, the length of said sheet and the spring bias on the roller being sufficient to ensure bridging of said gap throughout any relative angular movement which might occur between said driving cab and said load-carrying trailer.

Preferably the width of said sheet is at least substantially the same as the height of the back of the driving cab of the tractor-trailer vehicle to which the side curtain air deflector is to be mounted. The maximum width of said sheet for the side curtain air deflector would be dictated by the height of the air-deflector device when mounted upon the roof of the vehicle cab and adjusted to the optimum angle of inclination to obtain minimum aerodynamic drag on the load-carrying trailer of the vehicle.

As examples, the adjustable air-deflector device of the invention, alone and in combination with a pair of side curtain air deflectors, will now be particularly described with reference to the accompanying drawings in which.

Figure 1:
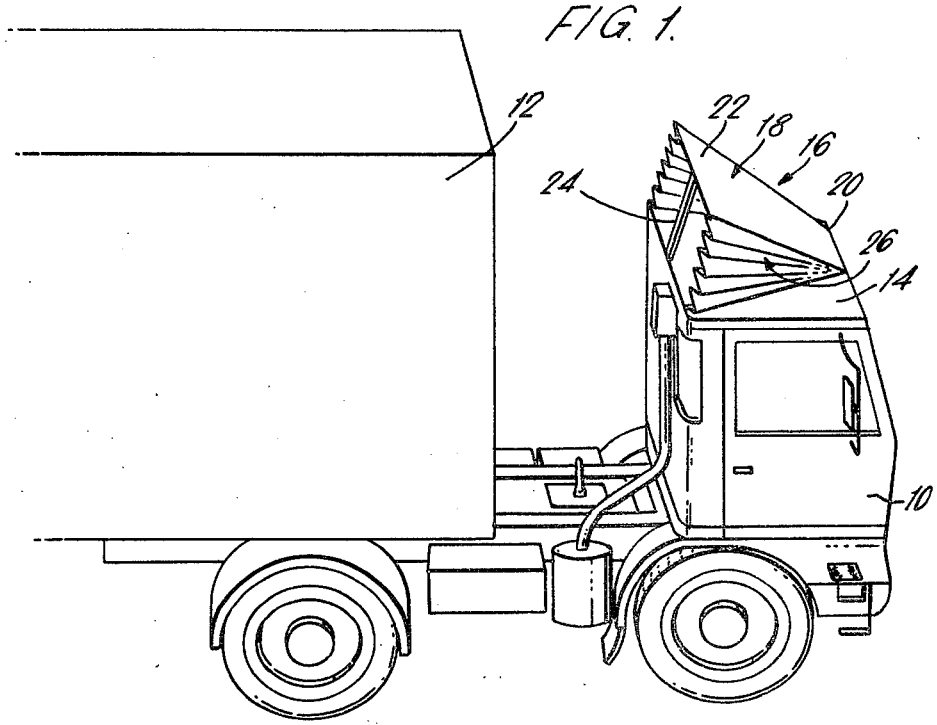
FIG. 1 shows a scale model of a commercial vehicle tractor cab and trailer arrangement with an air-deflector device according to the invention in a raised position.

Referring now to FIG. 1, the tractor trailer arrangement comprises a tractor cab 10 and a trailer 12 which constitutes the load-carrying portion of the vehicle. Mounted upon the roof 14 of the vehicle cab is an air deflector 16 according to the invention. The air-deflector 16 comprises a substantially planar member 18 having the shape of a truncated isosceles triangle, the shorter parallel edge 20 of which is hingedly secured to the cab roof 14 adjacent a forward edge thereof. Extending between the longer parallel edge 22 of the planar member 18 and the vehicle cab roof 14 is an angle-adjustment means 24 comprising a screw-thread extension rod threadedly engages with an adjustment nut retained on the roof 14 of the vehicle cab. Each of the non-parallel edges of the planar member 18 is provided with an adjustable side wall 26 formed from a flexible sheet material folded in accordion pleats, the free end of each side wall being secured to said driving cab roof in such a manner that the triangular-shaped gap formed between the non-parallel edge of the planar member 18 and the cab roof 14 is effectively bridged for any angle of inclination of said planar member 18 between a predetermined maximum angle, arranged to be sufficient to give the minimum drag conditions for the maximum heights of the trailer compared to the tractor cab, and a minimum angle in which the planar member 18 lies in the position shown in FIG. 2, namely, substantially parallel to the roof 14 of the tractor cab.

Figure 2:
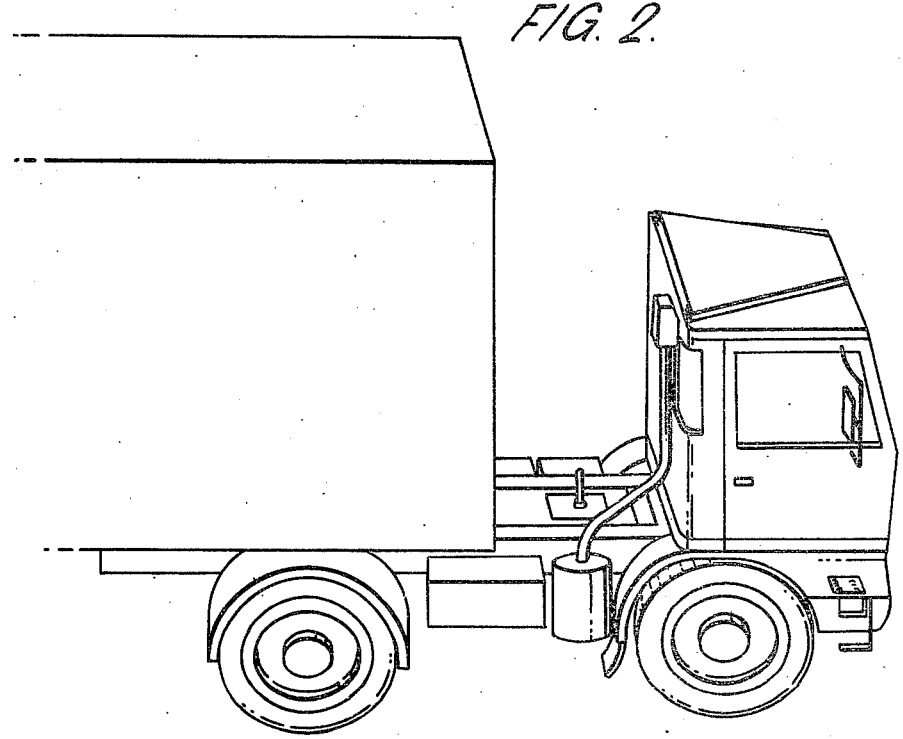
FIG. 2 shows the same scale model as in FIG. 1, with the air-deflector device of the invention in a lowered position.

The scale model illustrated in FIGS. 1 and 2 of the drawings is a quarter scale model of a Vauxhall T M truck and trailer combination. Extensive wind tunnel tests carried out on this model equipped with the air-deflector of the invention, and upon other scale models of the Vauxhall range of commercial vehicles, have shown clearly that it is possible to obtain a minimum drag co-efficient for each and every vehicle by the appropriate adjustment of the angle of inclination of the air deflector device 16. Thus, it is possible, using scale models in windtunnel tests, to produce calibration curves for air deflectors which enable an operator of a commercial vehicle fitted with an air deflector according to the invention to determine the optimum angle of inclination of the deflector required in order to obtain a minimum drag co-efficient for the load-carrying portion of the commercial vehicle in question. Since the air-deflector device of the invention can be adjusted to a minimum profile relative to the cab roof, this avoids any penalty as regards undue drag on the vehicle occasioned if, for example, the vehicle comprises a tractor cab travelling with a flat bed trailer in an unloaded condition or a tractor cab travelling alone.

Figure 3:
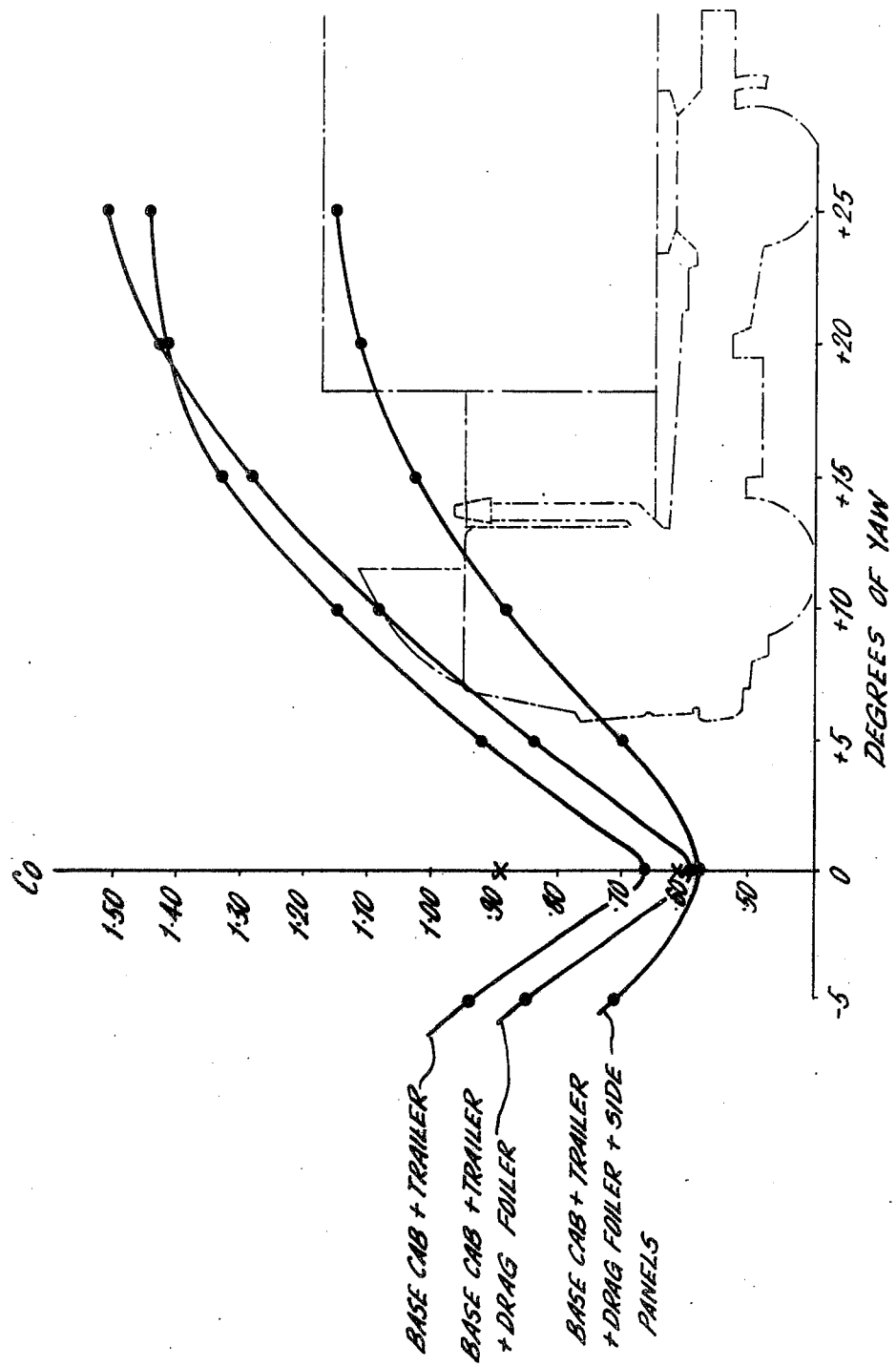
FIG. 3 is a graphical representation of the effects on the drag co-efficient for tractor-trailer combinations when subjected to increasing degrees of yaw.

In tractor trailer arrangements in which the trailer is articulated to the tractor cab, the aerodynamic drag characteristics displayed by the arrangement change as the trailer moves in respect to the tractor cab. Thus, it can be seen from FIG. 3 that, as the degrees of yaw existing between the tractor cab and the trailer increase, the drag co-efficient increases. As can be seen from FIG. 3, the addition of an air deflector device, indicated as a drag foiler on FIG. 3, has the effect of reducing the drag co-efficient below the drag co-efficient of the tractor and trailer arrangement without such an air-deflector device throughout the range of 0 to 15 degrees of yaw. The addition of side curtain air deflectors to the air-deflector device of the invention, according to the preferred embodiment of the invention, can be clearly seen in FIG. 3, where the relevant curve indicates that there is a substantial reduction in drag co-efficient over a total range of 0 to 25 degrees of yaw.

Figure 4:
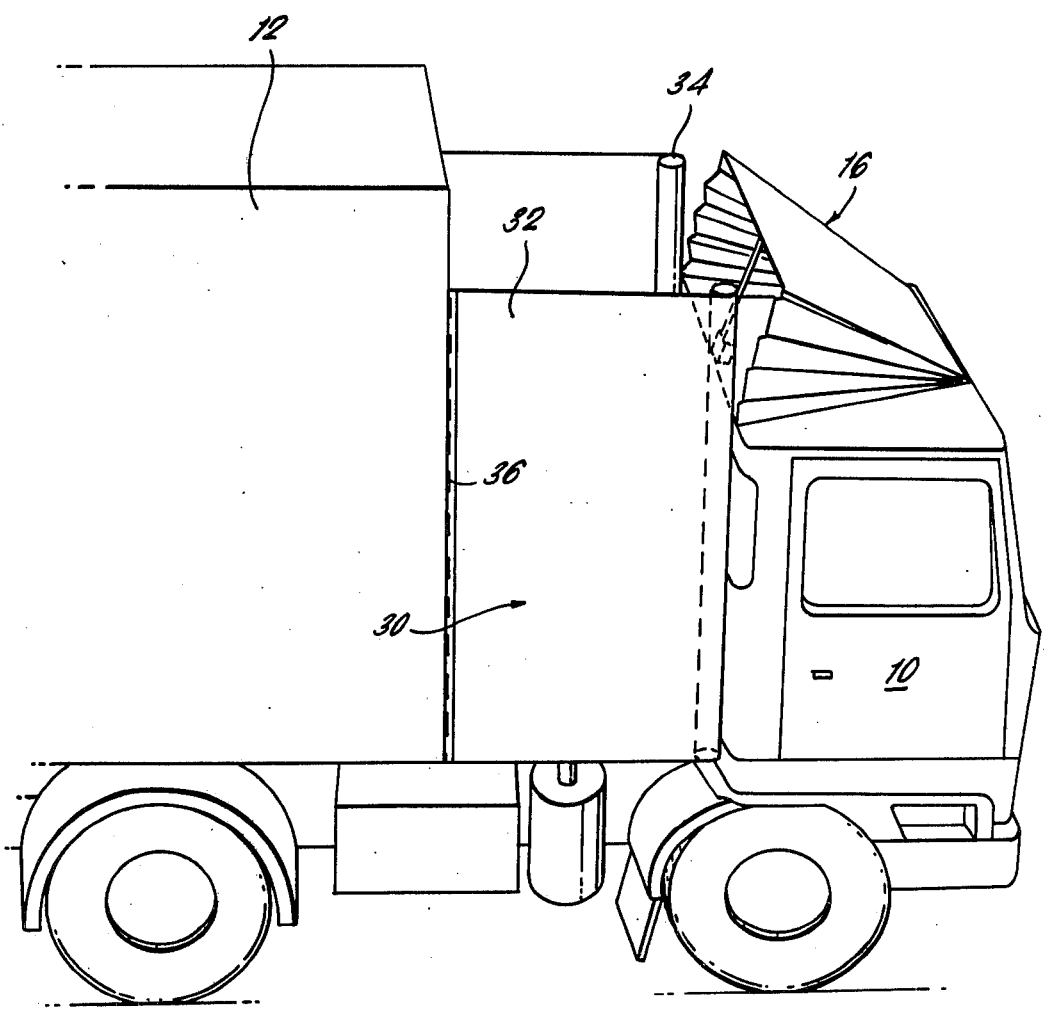
FIG. 4 shows a scale model of a tractor trailer arrangement similar to that shown in FIG. 1 with the addition of side curtain air deflectors according to the preferred embodiment of the invention.

The desired combination of air-deflector device side curtain air deflectors according to the preferred embodiment of the invention is shown in FIG. 4 of the drawings. In this Figure, it can be seen that each side curtain air deflector 30 comprises a substantially rectangular sheet 32 of flexible material retained upon a spring biased roller 34 which is mounted within a support frame (not shown), which support frame is secured to a rear side edge of said driving cab 10. The free edge 36 of the flexible sheet 32 is anchored to a forward vertical side edge of the trailer 12 by means of tie-cords. The length of the sheet 32 and the spring bias on the roller 34 for each side curtain air deflector is such that, as the tractor cab 10 moves relative to the trailer 10, the sheet 32 is either wound upon the roller 34 or is unwound from the roller 34, depending on the degree of yaw existing between the vehicle cab 10 and the trailer 12. Thus the presence of these side curtain air deflectors is effective to ensure that air is not spilled from the gap between the tractor cab and the trailer as the tractor cab moves relative to the trailer. In the arrangement shown in FIG. 4, the width of the sheet 32 is such that it extends from the base of the tractor cab to the top of the inclined air deflector 16 when said air deflector is in the position producing minimum drag for the combination of the tractor cab 10 and trailer 12. Wind tunnel tests carried out on scale models equipped with side curtain air deflectors extending the height of the vehicle cab 10 have shown that an appreciable reduction in the drag co-efficient under conditions of yaw between 0 to 25 degrees of yaw is obtainable. Consequently, it is envisaged that, in commercial practice, side curtain air deflectors of a width corresponding to the height of the vehicle cab would be used in practice in combination with an adjustable air-deflector device adjustable in inclination to obtain a requisite minimum drag co-efficient for the arrangement as a whole.

Thus the basic invention disclosed in this application renders it possible for an operator of a commercial vehicle to materially reduce fuel costs in operating the vehicle by adjusting an adjustable air deflector device according to the invention, fitted to the cab roof of the vehicle, so as to obtain a minimum drag co-efficient for the vehicle. In respect of a commercial vehicle operator utilizing a tractor cab-trailer arrangement, where the operator may be hauling different size containers from place to place utilizing the same tractor cab, it is possible for said operator to adjust the air deflector device according to the invention, when installed upon the roof of the vehicle cab, to reduce the drag co-efficient for each arrangement to a minimum.

Moreover, the preferred embodiment of the invention, in which an adjustable air deflector device according to the invention is utilized with a pair of side curtain air deflectors between the tractor cab and the trailer of an articulated arrangement, enables an operator of such an arrangement to achieve substantial economies in fuel comsumption by materially decreasing the drag co-efficient experienced on said arrangement both whilst in straight line motion and in motion involving relative movement between the tractor cab and the trailer.

What is claimed is:

1. A tractor trailer air deflector device for use on the roof of a tractor cab comprising:
   a generally planar member having the shape of a truncated isosceles triangle, said planar member having angularly disposed side edges and a parallel edge disposed adjacent a forward portion of the cab roof and a longer parallel edge disposed adjacent a rearward portion of the cab roof,
   hinge means mounting the parallel edge to the forward portion of the cab roof to permit pivotal movement of the planar member to varying air deflecting angular positions relative the cab roof,
   an air deflecting side member extending generally vertically between each side edge of the planar member and the cab roof, said side members including a plurality of elements foldably connected for folding relative one another to accommodate variation in angle of the generally planar member relative to the cab roof,
   and means acting beetween the rearward end of the planar member and the cab roof to control the angular position of the planar member.

* * * * *